United States Patent [19]
Bullock et al.

[11] Patent Number: 5,612,265
[45] Date of Patent: Mar. 18, 1997

[54] COMPOSITES FOR WEAR

[75] Inventors: Edward Bullock; Jean B. Veyret, both of Bergen, Netherlands

[73] Assignee: European Atomic Energy Community (Euratom), Luxembourg, Luxembourg

[21] Appl. No.: 408,439

[22] Filed: Mar. 22, 1995

[30] Foreign Application Priority Data

Mar. 29, 1994 [EP] European Pat. Off. ............ 94200780

[51] Int. Cl.$^6$ ...................... C04B 35/565; C04B 35/584
[52] U.S. Cl. .................. 501/89; 501/90; 501/95; 501/97; 501/98; 501/100; 428/196; 428/210; 428/446; 428/450; 428/689; 428/697; 428/698; 428/699
[58] Field of Search ................................ 501/100, 89, 90, 501/95, 96, 97, 98, 99; 428/446, 688, 689, 698, 196, 210, 450, 697, 699

[56] References Cited

U.S. PATENT DOCUMENTS

| 4,925,815 | 5/1990 | Tani et al. | 501/95 |
| 5,376,599 | 12/1994 | Oshima et al. | 501/95 |

FOREIGN PATENT DOCUMENTS

| 0477755A1 | 4/1992 | European Pat. Off. |
| 0497345 | 8/1992 | European Pat. Off. |
| WOA9320024 | 10/1993 | WIPO |

OTHER PUBLICATIONS

K. Sato, et al., Frabrication of Silicon Nitride Based Composites by Impregnation with Perhydropolysilazane, 100 (1992) Apr., No. 4, pp. 450–453, Journal of the Ceramic Society of Japan, International Edition.

H. Kodama, et al., Silicon Carbide Monofilament–Reinforced Silicon Nitride or Silicon Carbide Matrix Composites, 72 (1989) Apr., No. 4, pp. 551–558, Journal of the Aermican Ceramic Soceity.

K.M. Prewo, et al., Fiber Reinforced Glasses and Glass–Ceramics for High Performance Applications, vol. 65, No. 2 (1986), pp. 305–313, Ceramic Bulletin. (no month).

*Primary Examiner*—Mark L. Bell
*Assistant Examiner*—Michael Marcheschi
*Attorney, Agent, or Firm*—Pennie & Edmonds

[57] ABSTRACT

The invention discloses a long carbon fibre reinforced ceramic matrix composite in which the matrix is an engineering ceramic, characterized in that the engineering ceramic comprises $Al_2O_3$ and $Y_2O_3$ as highly refractory sinter additives, the composite has a high density of at least 95% theoretical, a high fibre content of at least 30% by volume, and that substantially all the fibres are uniformly distributed within the matrix with a uniform inter-fibre spacing of 10–15 micrometer. The invention also discloses a process for preparing such a composite, characterized in that unidirectionally wound fibre tapes are cut into sections, the sections are infiltrated by the matrix material in the form of a slurry of the ceramic itself or as a precursor material, the infiltrated fibre tape sections are successively stacked and pressed wet to achieve intermeshing of the tape sections, compacted, dried and hot pressed. The invention also relates to the use of said composite as a self-lubricating material for dry sliding applications, especially on metals.

18 Claims, 2 Drawing Sheets

COMPOSITES FOR WEAR

FIELD OF THE INVENTION

The present invention relates to a long carbon fibre reinforced ceramic matrix composite, a process for manufacturing the same, and the use of bodies of said composite for applications requiring low wear and friction properties.

BACKGROUND OF THE INVENTION

Ceramics are attractive candidate materials for wear applications owing to their excellent properties of thermal stability, high elasticity, hardness, resistance to chemical corrosion and low inertia. Monolithic oxide, nitride and carbide ceramics, as $Al_2O_3$, $ZrO_2$, $Si_3N_4$, SiC and others have been recognized as potential materials for use in structural applications such as seal rings, valve seats, dies for extrusion, guides, valve tram components and bearing parts of cylinder liners (Czichos H., Woydt M., Klaffke D. and Lexow J., Materiaux et Techniques, 1989).

The major shortcoming of the materials is their low fracture toughness, resulting in inherently brittle components. In recent years considerable effort has been devoted world-wide to improving ceramic fracture toughness, primarily for structural engineering applications, by incorporating additional phases into the base materials generally in the form of fibers, whiskers or particles (Evans A. G. and Cannon R. M., Acta Metall 34 (1986) 761). Very few studies have considered the development of Ceramic Matrix Composite (CMC) materials for tribological applications and most of these are focused on whisker reinforced ceramics (Yust C. S., Leitnaker, J. M. and Devore, C. E., Wear 122 (1988) 156, Yust, C. S. and Devore, C. E., Tribol Trans 34 (1991), Liu H., F E M E and Cheng H. S., J. Am Ceram Soc 74 (1991) 2224). Nevertheless, the improvement of fracture toughness of ceramics designed for wear applications is of considerable industrial importance and the tailoring of the combined properties of the component phases offers an excellent opportunity to optimize the frictional and wear properties of the composite.

Wear damage in ceramic-metal couples in dry sliding conditions arises from mechanical and tribo-chemical interactions between the touching faces. Mechanical abrasive wear results from impact fracture of microscale features of the ceramic and the physical removal of particles from the ceramic surface. These particles may become trapped between the wear surfaces and further contribute to wear damage of the couple. Tribo-chemical, adhesive wear arises from cold welding of asperity junctions in the contact faces. Further, sliding leads to the fracture of these junctions in one or other of the contacting materials. In the case of ceramic/metal pairs, adhesive wear can result from high local surface temperatures. The location of the subsequent fracture will depend upon the particular materials involved. The intrinsic strength of engineering ceramic materials confers a high degree of wear resistance. Unless the ceramic exhibits weakness or brittleness in the microscale of the weld zone, the wear debris will contain a reasonable proportion of metallic component. Such debris can re-adhere to the contacting surfaces leading to the formation of an adherent transfer film of metal on the ceramic. Subsequent contact with the metal counter body may then lead to adhesive wear as the bulk metal adheres to the transfer film.

SUMMARY OF THE INVENTION

The object of the invention is to reduce wear damage in these systems by reducing the propensity to brittle fracture by increasing fracture toughness, reducing crack initiating flaws, macrodefects etc., and by reducing tribo-chemical interaction.

Now we have found that by impregnating unidirectionally wound tape consisting of long carbon fibers with an appropriate matrix material using a special route dense process, composites having low brittleness, reduced tribochemical interaction and excellent wear properties can be obtained.

Accordingly, the invention provides a long carbon fibre reinforced ceramic matrix composite in which the matrix is an engineering ceramic wherein the engineering ceramic includes $Al_2O_3$ and $Y_2O_3$ as highly refractory sinter additives, wherein the composite has a high density of at least 95% by volume, and wherein substantially all fibers are uniformly distributed within the matrix with a uniform inter-fibre spacing of at least 10–15 micrometers.

In another aspect, the invention provides a process for preparing a long carbon fibre reinforced ceramic matrix composite wherein unidirectionally wound fibre tapes are cut into sections, the sections are infiltrated by the matrix material in the form of a slurry of the ceramic itself or as a precursor material, the infiltrated fibre tape sections are successively stacked and pressed wet to achieve intermeshing of the tape sections, compacted, dried and hot pressed.

In yet another aspect, the invention provides the use of a long carbon fibre reinforced ceramic matrix composite as a self-lubricating material for dry sliding applications, especially on metals.

The fabrication of a dense long-fibre ceramic composite can be achieved only by high temperature sintering. For composites of high fibre content, high density composite fabrication also requires the application of pressure at sintering temperatures. The compromise between on the one hand, the desired features of high total fibre content, the uniform distribution of fibers within the matrix, the complete infiltration of the matrix to eliminate the intrinsic flaws and macrodefects, and on the other the cost of processing, is difficult to realize. All fabrication routes depend upon the infiltration of fibre weaves by matrix material, in the form of the ceramic itself or as a precursor material which may be later pyrolyzed to the ceramic. The process of the invention comprises liquid infiltration by ceramic dispersions (slurries), which is the cleanest and simplest method of forming green bodies. Densities of ca. 70% can be achieved in green bodies which contain minimum quantities of polymer additives which will need to be burned out during subsequent pressure sintering. The final composite should ideally have a maximum fibre content with a uniform inter fibre spacing of ca. 10–15 μm fully infiltrated by the ceramic matrix.

Optimum slurry infiltration of all filaments in the fibre weave demands a careful balance between the processing parameters. Examples are: the ceramic dispersion itself should balance a maximum solid content to obtain high green density and minimum flaw inclusion, against a low viscosity adequate to allow ingress between all filaments. The application of external pressure while promoting bulk ingress tends to compress fibers together, inhibiting infiltration of tightly woven filament bunches. Inadequate pressing of the wet green form leaves large pockets and lamellae of monolithic ceramic which provide sites of low fracture toughness in the final ceramic. During the pressure sintering, the timing of application of pressure is crucial to minimize chemical degradation of the chemical species, while not damaging the fibers.

To achieve the required characteristics of the composite, the fibers selected are high elastic modulus carbon fibers fabricated from meso-pitch precursors. These high stiffness fibers confer improved fracture toughness on the supporting ceramic while the high carbon content of the composite promotes the development of graphitic lubricating debris during wear. The fibre content of the composite is at least 30% by volume and preferably 35%. The fibers are entrained within a high strength engineering ceramic matrix. The matrix material is preferably a non-oxide ceramic, such as $Si_3N_4$ or SiC. The matrix comprises $Al_2O_3$ and $Y_2O_3$, preferably in a content range of 2.5–3.5 and 7.5–6.5 wt % of matrix weight, respectively. The composite is prepared by the spreading and winding of fibre tows into uniaxial tapes of two layers in which the individual filaments are closely parallel, the development of an aqueous ceramic dispersion of 65 wt % solid content containing a dispersant, preferably up to 0.2 wt % of solids weight, and/or a wetting agent, preferably up to 2.0 wt % of liquids, to obtain optimal viscosity and wetting conditions to allow full infiltration of fibre tape sections and spreading of fibre bunches to ensure penetration of the ceramic dispersion between all fibre filaments, minimization (i.e., approaching to zero) of areas of non-infiltration porosity, infiltration of the spread and wound double layer, uniaxial fibre types with the aqueous ceramic slurry, both with and without ultrasonic agitation, successive stacking of infiltrated fibre tape sections and pressing with a ridged plate to promote interweaving of fibre filaments and to minimize areas of residual monolithic ceramic, squeeze pressing of the final tape-section stack to obtain an optimized ratio of fibre to matrix, and hot pressing the dried stack to a full density of at least 95% theoretical and preferably 98–99%. The hotpressing is preferably carried out at a temperature of 1750° to 1950° C. and a pressure up to 30 MPa.

The final ceramic microstructure contains a maximum fibre volume content in which the individual fibre filaments are uniformly dispersed within the ceramic, as far as is allowed by the requirement to create a fully dense composite with a minimum population of internal macrodefects, either by cracking or porosity.

The composite demonstrates superior friction/wear properties as compared to a corresponding monolithic ceramic and to a composite fabricated by a traditional slurry infiltration and hot pressing technique respectively.

DETAILED DESCRIPTION OF THE INVENTION

The invention is now illustrated in more detail in the following example.

EXAMPLE

Carbon Fibre—Silicon Nitride Composite

Figure 1A:
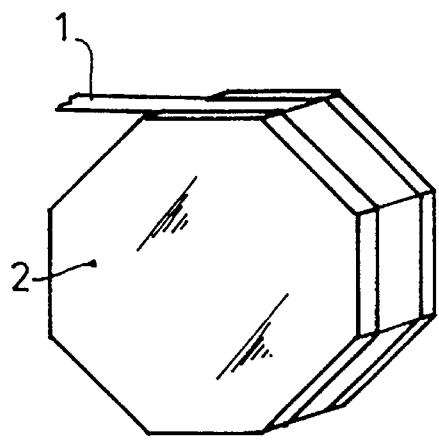
FIGS. 1A–1D show various stages of the green forming process for wear resistant composites of the present application.
Figure 1B:
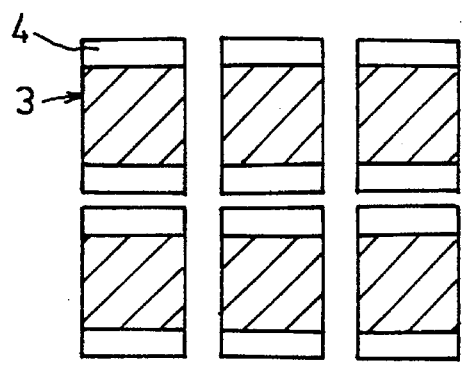

Fibre preforms are prepared by winding a high modulus carbon fibre tow 1 (TONEN FT 500), containing 3000 filaments, on to an octagonal mandrel 2 (see FIG. 1A). TONEN FT 500 fibers have an elastic modulus of 550 GPa. The filaments are uniformly spread during winding using a spreading device, yielding thin 55 mm width tapes. Two layers are applied per tape keeping the filaments of each layer parallel with the other. The double layer tapes are then divided into sections by pressure application of glue strips 4 across the tapes on the mandrel at 120 mm lengths. The sections are cut and removed from the mandrel. FIG. 1B shows the fibre tape sections 3 after cutting.

The fibre tape sections are clamped and immersed in an aqueous ceramic slurry 5 containing silicon nitride powder (SN-E-10) with the addition of 6.9 wt % aluminum oxide (source) and 3.1 wt % yttrium oxide (source) as sinter aids. The slurry is prepared by attrition milling an aqueous dispersion of the powders at 65 wt % solid content for 2 hours using the commercial dispersant DARVAN C (0.2 wt % solid content) at 13° C. Following milling, the dispersion pH was adjusted to 10.5 using tetramethyl ammonium hydroxide. To the dispersion was added a fibre wetting agent AEROSOL TO (1 wt % weight of water) and the dispersion degassed while stirring continuously for 24 hours before use. The slurry viscosity at time of infiltration is 45 cps (128 $s^{-1}$ shear rate).

Figure 1D:
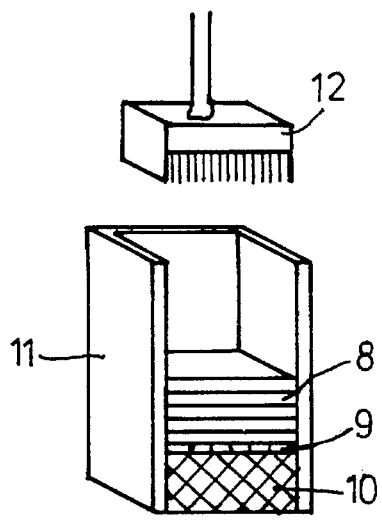
Figure 1C:
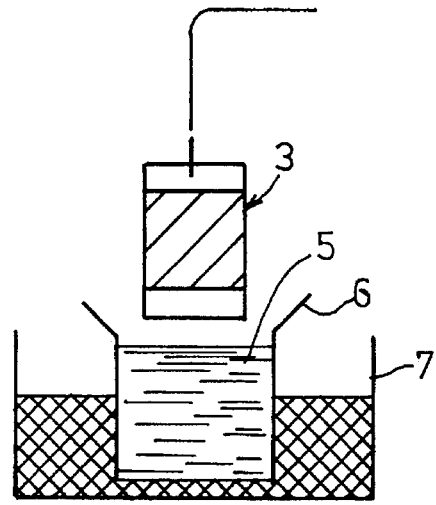

Infiltration of the fibers was achieved by vertical and/or horizontal immersion of the fibre tape sections 3 in the slurry 5 for 2 minutes under ultrasonic agitation. FIG. 1C shows vertical immersion of a clamped fibre tape section 3 in a slurry 5 contained in a shun, vessel 6 placed in an outer tank 7. The sections are then removed from the slurry and the impregnated sections 8 are stacked horizontally maintaining the parallelity of the fibers on to a flat plaster mould 10 covered with a 100 mesh filler cloth 9 in a holder 11 (see FIG. 1D). Each successive tape section is pressed into the stack using a ridged grid 12 (see FIG. 1D), in order to promote intermeshing of the filaments between the successive layers, to eliminate layers of monolithic ceramic, and to squeeze out trapped air bubbles. Fifteen tape sections are stacked per sample yielding a thirty-ply composite plate. The infiltrated tape stacks are then covered with a 100 mesh filter cloth and a porous metal grid and squeeze pressed to 6 mm thickness to achieve the optimum ratio of fibre to matrix content.

Figure 2:
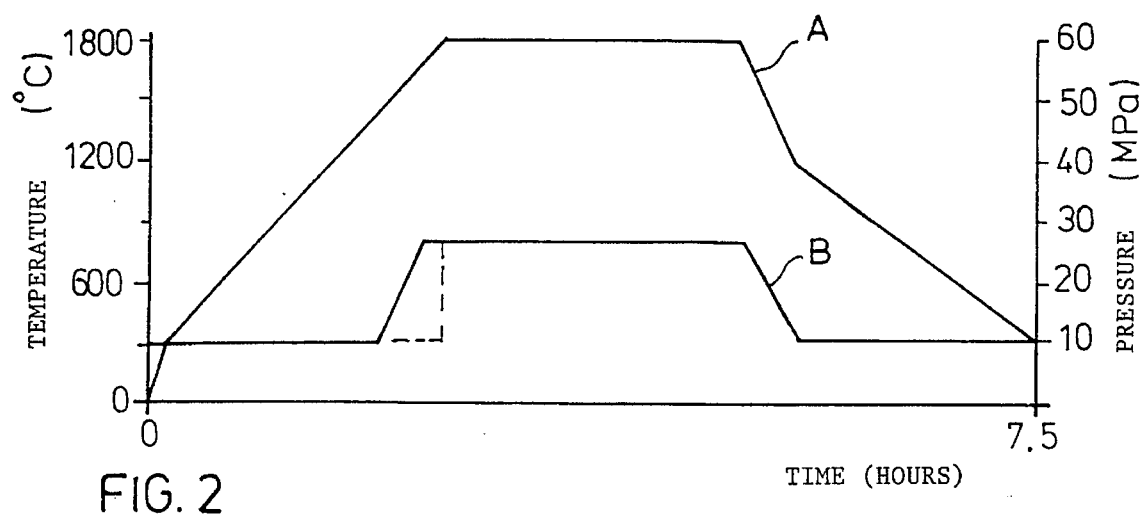
FIG. 2 is a graph showing the temperature and pressure profile for hot pressing of C-fibre/$Si_3N_4$ composites.

Sample plates are dried for 3 hours under pressure and cut into 45×45 mm plates and dried over 48 hours at room temperature and then fully dried by heating to 400° C./min, holding for 1 hour and recooling at 8° C. per minute, to yield a green density of some 70% theoretical. The samples were densified by hot pressing at 1750° C. for 2 hours at 27 MPa axial pressure in nitrogen gas at overpressure of 1 bar. The temperature and pressure cycles are shown in FIG. 2 by lines A and B, respectively. The application of mechanical and gas pressure was designed to cause minimum damage to the fibers while the ceramic was below sinter temperatures, while preventing decomposition of silicon nitride at higher temperatures.

The final composite has a uniformly distributed fibre content of 35% and a density of ca 98–99% theoretical and no visible macroporosity.

Samples for wear and friction testing were prepared by cutting prismatic specimens (3×3×20 $mm^3$) from the composite plates and from a commercial hot pressed silicon nitride (CERALLOY). One end of each pin was rounded to a radius of curvature of 3 mm and polished in a hemispherical mold with diamond compounds to a finalsurface roughness of 12 μm $R_a$ or the monolithic ceramics and 13 μm $R_a$ for the composites. The counterface discs were manufactured from a standard 100Cr6 steel. The discs were finished to a surface roughness of 0.15 $R_a$. Prior to testing, both flat and pin specimens were ultrasonically cleaned in acetone.

Tests were conducted using a pin-on-disk type arrangement. The pin was clamped in a holder arm, which was pivoted to allow normal loading and friction measurements. The pin was mounted in the specimen holder with the fibre perpendicular to the counterface. The test parameters are given in Table 1. In all tests the frictional force was continuously recorded by means of a strain-gauge device.

Figure 3:
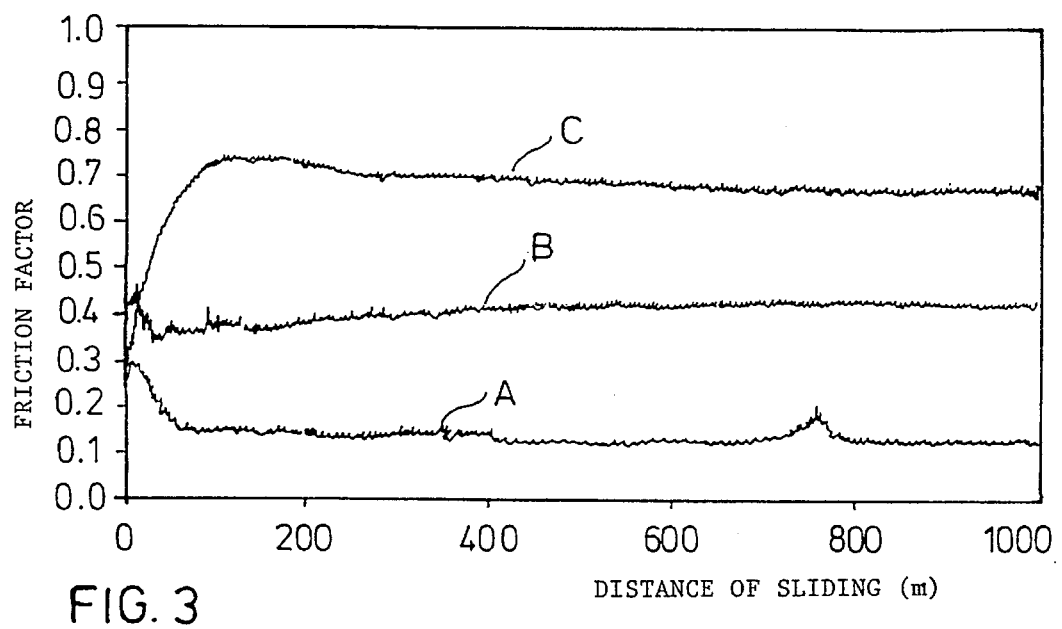
FIG. 3 is a graph comparing the variations of friction coefficient with sliding distance for composites of the present invention and composites of the prior art.

FIG. 3 shows the variation of friction coefficient (u) with sliding distance for the combinations studied. In FIG. 3, line A represents the results obtained with a $C/Si_3N_4$ composite prepared using the invention process, while lines B and C represent $C/Si_3N_4$ composite prepared by conventional processing and a $Si_3N_4$ monolithic heat pressed ceramic, respectively. In all cases test indicated in initial period, sometimes up to 200 m, in which the friction coefficient changed considerably which was followed by a steady state of nearly constant friction value. The final friction and wear values of the various material combinations are shown in Table 2. These are the values taken at the end of each test.

The friction and wear results from the composite pins are strongly dependent upon the quality of the $C/Si_3N_4$ composite. The composites prepared by the process of the invention—labelled good composite—were compared with the material prepared using a less rigorous literature-reported (Prewo K. M., Brennan J. J. and Layden H. K. (1986) Fiber reinforced glasses and gla-ceramics for high performance applications, Am. Ceram. Soc. Bull., 65, 305–322) slurry infiltration technique. These "poor" composite structures contain some fibre bunching in which the matrix walls between fibers are sometimes thin, and where occasionally the matrix is not fully infiltrated leaving small pores. The sliding surfaces of the pin and the disc were analyzed by SEM/EDS after testing.

The friction coefficient profiles for the monolithic $Si_3N_4$ on 100Cr6 show a typical build up of a debris layer by adhesive wear. The debris adheres to the disc and acts as a constant source of interfacial fine powder leading to a steady state abrasive process, involving the recirculation of a non-adherent mixture of amorphous metal and ceramic particles, the majority of which is dumped ahead of the leading edge of the pin.

For the composite pins the initial friction coefficient goes through a distinct peak associated with the development of a steady state debris layer by adhesive wear mechanisms. The "good" and "poor" composites show rather different behavior. The "good" composites have a homogeneous distribution of fibers. The pin surfaces remain virtually completely clean of adherent deposit and no craters are formed on the pin surface. Since the adhesion between graphite and iron is relatively poor it is assumed that silicon nitride from the composite pin is transferred to the steel disk. The initial friction is probably due to the adhesion between the matrix composite and the steel disk. This adhesion is gradually decreased by the formation of a Si(nitride)—Fe—C powder film at the interface. In steady state, the film is thick enough to reduce adhesion and to confer some degree of lubrication. The improvement of the lubrication of the debris mix is confirmed by the dramatic reduction in steady state friction coefficient from 0.65 for the monolithic $Si_3N_4$ to 0.12 for the composite.

The "poor" composite pins are rapidly covered by an adherent layer during the initial friction coefficient peak, which is then retained for the lifetime of the test. The formation of the adherent layer, in the initial stage of wear, takes place at defects, created either by areas of incomplete infiltration of the fibre preform or by fracture in the thin matrix walls surrounding the fibers in the fibre bunches. These defects can be found in areas where the volume content of fibre is very high.

TABLE 1

Wear and Friction Test Parameters

| | |
|---|---|
| Tribotest device | Pin on Disc |
| Sliding Speed (mm/s) | 100 |
| Load (N) | 10 |
| Total Sliding Distance (m) | 1000 |
| Atmosphere (% RH) | 50 |
| Materials | pins: $Si_3N_4$, $C/Si_3N_4$ discs: steel 100Cr6 |

TABLE 2

Friction and Wear Results for the Comparative Ceramic Materials

| Sample | Humidity % | Friction Factor | Wear Rate Pin | Wear Rate Disc | Total Wear |
|---|---|---|---|---|---|
| C1 | 50 | 0.12 | 7.16E-7 | 4.01E-5 | 0.028 |
| C2 | 50 | 0.14 | 4.77E-5 | 2.42E-6 | 0.055 |
| C6 | 50 | 0.40 | 2.82E-6 | 2.1E-5 | 0.025 |
| C7 | 50 | 0.40 | 3.71E-5 | 4.78E-5 | 0.030 |
| HP1 | 50 | 0.62 | 4.07E-5 | 2.05E-6 | 0.10 |
| HP2 | 50 | 0.65 | 4.35E-6 | 4.35E-5 | 0.10 |

C1/2 = Composite prepared by the process route of the invention
C6/7 = Composite prepared by traditional processing.
HP1/2 = Monolithic $Si_3N_4$

We claim:

1. A carbon fibre reinforced ceramic matrix composite comprising carbon fibres and a matrix of an engineering ceramic which includes $Al_2O_3$ and $Y_2O_3$ as sinter additives, said composite having a density of at least 95% theoretical, a fibre content of at least 30% by volume and said fibres being uniformly distributed within said matrix with an inter-fibre spacing of about 10–15 micrometers.

2. A composite according to claim 1, wherein said fibres are elastic.

3. A composite according to claim 1, wherein said ceramic is $Si_3N_4$ or SiC.

4. A composite according to claim 1, wherein said $Al_2O_3$ additive is present in an amount of 2.5–3.5 wt % of said matrix and wherein said $Y_2O_3$ additive is present in an amount of 7.5–6.5 wt % of said matrix.

5. A composite according to claim 4, wherein said density of said composite is at least about 98% theoretical.

6. A composite according to claim 4, wherein said fibre content is at least about 35% by volume.

7. A carbon fiber reinforced ceramic matrix composite comprising carbon fibers and a matrix of an engineering ceramic which includes $Al_2O_3$ and $Y_2O_3$ as sintering additives, said composite having a density of at least 95% theoretical, a fiber content of at least 30% by volume and said fibers being uniformly distributed within said matrix with an inter-fiber spacing of about 10–15 micrometers, said composite being produced by the process which comprises cutting unidirectionally wound fiber tapes having filaments into sections, infiltrating the sections with the matrix, successively stacking the infiltrated fiber tape sections, wet pressing the stacked sections to achieve intermeshing of the tape sections, and thereafter compacting, drying and hot pressing the intermeshed tape sections.

8. The composite according to claim 7, wherein the unidirectionally wound fibre tapes comprise two layers in which the filaments are closely parallel.

9. The composite according to claim 8, wherein said sections are infiltrated by the matrix in the form of a slurry of solids and liquids, said slurry having a solids content of at least 65 wt %.

10. The composite of claim 9 wherein the slurry contains a dispersant, a wetting agent or mixtures thereof.

11. The composite of claim 10 wherein the dispersant is present in an amount up to 0.2 wt % of said matrix.

12. The composite of claim 10 wherein the wetting agent is present in an amount up to 2.0 wt % of said liquids.

13. The composite of claim 12 wherein the slurry is prepared by attrition milling.

14. The composite of claim 13 wherein the tape sections are infiltrated under ultrasonic agitation.

15. The composite of claim 14 wherein the hot pressing is carried out at 1750°–1950° C. and at a pressure up to 30 MPa.

16. A composite according to claim 1 in combination with a separate member, said separate member having an outer surface, and said composite being in dry sliding contact with said surface.

17. A carbon fibre reinforced ceramic composite comprising:

a matrix of a non-oxide ceramic which includes 2.5 to 3.5 weight percent of $Al_2O_3$ and 7.5 to 6.5 weight percent of $Y_2O_3$ as sintering additives, said weight percents calculated based on the weight of the matrix; and carbon fibers present in an amount of at least 30% by volume of the composite, said fibers being uniformly distributed within said matrix at an inter-fibre spacing of about 10–15 micrometers;

wherein the composite has a density of at least 95% theoretical.

18. The composite according to claim 16, wherein the separate member is a metal member.

* * * * *